(12) United States Patent
Lund

(10) Patent No.: US 7,730,296 B2
(45) Date of Patent: Jun. 1, 2010

(54) METHOD AND SYSTEM FOR PROVIDING SYNCHRONOUS RUNNING ENCODING AND ENCRYPTION

(75) Inventor: Martin Lund, Menlo Park, CA (US)

(73) Assignee: Broadcom Corporation, Irvine, CA (US)

(*) Notice: Subject to any disclaimer, the term of this patent is extended or adjusted under 35 U.S.C. 154(b) by 1628 days.

(21) Appl. No.: 10/454,011

(22) Filed: Jun. 4, 2003

(65) Prior Publication Data

US 2004/0158703 A1 Aug. 12, 2004

Related U.S. Application Data

(60) Provisional application No. 60/463,000, filed on Apr. 15, 2003, provisional application No. 60/448,703, filed on Feb. 18, 2003, provisional application No. 60/446,894, filed on Feb. 12, 2003.

(51) Int. Cl.
*H04L 9/00* (2006.01)
*H04L 9/32* (2006.01)
*G06F 11/30* (2006.01)
*G06F 12/14* (2006.01)

(52) U.S. Cl. ............... 713/150; 713/151; 713/152; 713/153; 713/189; 713/190; 713/191; 713/192; 713/193; 713/194; 380/260; 380/261; 380/262; 380/263

(58) Field of Classification Search ............ 713/150
See application file for complete search history.

(56) References Cited

U.S. PATENT DOCUMENTS

| 4,730,348 | A | * | 3/1988 | MacCrisken | ............... | 375/240 |
| 2001/0018741 | A1 | * | 8/2001 | Hogan | ............... | 713/189 |
| 2001/0028318 | A1 | * | 10/2001 | Hogan | ............... | 341/58 |
| 2005/0226408 | A1 | * | 10/2005 | Hotz | ............... | 380/28 |

FOREIGN PATENT DOCUMENTS

| EP | 0896443 B1 | | 2/1999 |
| GB | 2 016 247 A | | 9/1979 |
| GB | 2016247 A | * | 9/1979 |

* cited by examiner

*Primary Examiner*—Longbit Chai
(74) *Attorney, Agent, or Firm*—McAndrews, Held & Malloy, Ltd.

(57) ABSTRACT

Aspects of the invention provide a method and system for coding information in a communication channel. More particularly, aspects of the invention provide an method and system for synchronous running encryption and/or encoding and corresponding decryption and decoding in a communication channel or link. Aspects of the method may include encoding and/or encrypting a first data using a first or second encoding table and/or a first or second encryption table. The method may indicate which one of the first or second encoding tables or which one of the first or second encryption tables were utilized for encoding and/or encrypting the said first data. The encoded and/or encrypted first data may subsequently be transferred downstream and decoded by synchronous decoder/decryptor using a corresponding decoding and/or decryption table. The corresponding decoding and/or decryption table may be determined based on the indicated first and/or second encoding and/or encrypting tables.

36 Claims, 10 Drawing Sheets

METHOD AND SYSTEM FOR PROVIDING SYNCHRONOUS RUNNING ENCODING AND ENCRYPTION

CROSS-REFERENCE TO RELATED APPLICATIONS/INCORPORATION BY REFERENCE

This application makes reference to, claims priority to, and claims the benefit of:

U.S. Provisional Application Serial No. 60/463,000 filed Apr. 15, 2003;

U.S. Provisional Application Serial No. 60/448,703 filed Feb. 18, 2003; and

U.S. Provisional Application Serial No. 60/446,894 filed Feb. 12, 2003.

The above stated applications are incorporated herein by reference in their entirety.

FIELD OF THE INVENTION

Certain embodiments of the invention relate to encoding of information. More specifically, certain embodiments of the invention relate to a method and system for providing synchronous running encoding and encryption and corresponding decoding and decryption in a communication channel or link.

BACKGROUND OF THE INVENTION

Serial data communication between two link partners in a digital communication system may be accomplished according to the general configuration of FIG. 1. FIG. 1 is a block diagram illustrating a conventional digital communication link 100 having a transmitter side 101 and a receiver side 102. The transmitter side 101 may include an encoder 103, a multiplexer (MUX) 104, and a modulator 105. The receiver side 102 may include a demodulator 106, a demultiplexer (DEMUX) 107, and a decoder 108. The transmitter side 101 and the receiver side 102 may be coupled by a link infrastructure 110. Alternatively, the link infrastructure may be a loopback path. Notwithstanding, the link infrastructure 110 may be, for example, shielded twisted pair, unshielded twisted pair (UTP), copper wire, or optical fiber.

Typically, the encoder 103 may be adapted to accept raw data bytes from an upstream component or entity of the digital communication system. The raw data bytes may be 8-bit words and may have been previously encrypted by an upstream component or entity of a digital communication system or the communication link 100. Prior encryption of the 8-bit words may ensure data integrity while the encrypted data traverses the digital communication link 100. Notwithstanding, the coded words may be coded in a manner specially designed to provide reliable transmission over the digital communication link 100.

The encoder 103 may encode each of the 8-bit words into a coded word having n bits. Generally, n is greater than eight (8) bits (n>8). Encoding the 8-bit words may generally be achieved by translating each 8-bit byte of data into a specially coded word having n bits where n is generally greater than eight (8). For example, for Gigabit Ethernet encoding, n is equal to ten (10). The additional (n−8) bits of data provide additional transmission overhead. The increased number of bits resulting from encoding may also provide data redundancy which is typically utilized for error detection. In addition to the encoding of data words, the additional bits may also be encoded to form control words. Standardized coding such as 3B4B, 5B6B or 8B10B coding are typically utilized to ensure data integrity and transmission reliability.

Once the raw data bytes have been encoded by the encoder 103, the resulting coded data 111a may be multiplexed into a serial bitstream 109a by the multiplexer 104. The resulting multiplexed serial bitstream 109a may subsequently be transferred to the modulator 105 for processing. The modulator 105 may perform digital-to-analog conversion on the serial bitstream 109a, resulting in an equivalent or corresponding bitstream 109b. The resulting analog serial bitstream 109b may be transferred to the receiver side 102 via the link infrastructure or loopback 110.

The demodulator 106 on the receiver side 102 may be adapted to receive the analog serial bitstream 109b transferred from the transmitter side 101. The demodulator 106 may perform an analog-to-digital conversion on the received serial bitstream 109b, resulting in a serial digital bitstream 109c. The resulting serial digital bitstream 109c generated by the demodulator 106 may be transferred to the demultiplexer 107 for processing. The demultiplexer 107 may be configured to demultiplex the serial digital bitstream 109c by executing the opposite of the multiplexing function performed by multiplexer 104.

The demultiplexer 107 may translate the serial bitstream 109c back into a datastream 111b containing n-bit coded words. For example, in the case of gigabit Ethernet, the demultiplexer 107 may translate the serial bitstream 109c back into 10-bit coded words. The n-bit coded words produced by the demultiplexer 107 may subsequently be transferred to the decoder 108 for processing. The decoder 108 may be adapted to execute the opposite of the encoder function performed by the encoder 103. In this regard, the decoder 108 may convert the n-bit coded words back into 8-bit unencoded bytes. These 8-bit unencoded bytes, if previously encrypted, may be decrypted by an upstream component of the digital communication link 100, for example.

Some coding schemes such as 3B4B, 5B6B and 8B10B encoding, utilize a concept referred to as running disparity (RD). Running disparity refers to the sign, whether positive (+) or negative (−), of a running digital sum (RDS) value. The running digital sum value may represent the running sum of the encoded bits used to represent unencoded data. Typically, logic one (1) may be represented by a positive one (+1) and a logic zero (0) may be represented by a negative one (−1). The running disparity and running digital sum are used in encoding to minimize the DC component of the transmitted coded words on the digital communication link 100.

For example, the 8B10B code is an encoding scheme that translates 8-bit bytes into 10-bit coded words using the running disparity. Some of the features provided by the 8B10B coding scheme may include DC balance, a maximum run length of 5, a maximum RDS of 3, a transition density of 3 to 8 transitions per 10-bit code group, separate code groups for control signaling, and a comma for synchronization of code groups. Below is a standardized 8B10B table that illustrates exemplary data code groups and their corresponding RD(−) and RD(+) translations. The first column of the table, referred to as the code group name, contains data values to be encoded. The second column of the table represents corresponding octal values for the data values to be encoded. The third column of the table represents corresponding byte bits values for the data values to be encoded. The fourth column represents the corresponding encoded (RD−) values for the data values that were to be encoded. Finally, the fifth column represents the encoded (RD+) values for the data values that were to be encoded.

| Code-Group Name | Byte Value | Byte Bits HGF EDCBA | RD (−) abcdei fghj | RD (+) abcdei fghj |
|---|---|---|---|---|
| D0.0 | 00 | 000 00000 | 100111 0100 | 011000 1011 |
| D1.0 | 01 | 000 00001 | 011101 0100 | 100010 1011 |
| D2.0 | 02 | 000 00010 | 101101 0100 | 010010 1011 |
| . | . | . | . | . |
| . | . | . | . | . |
| . | . | . | . | . |
| D0.1 | 20 | 001 00000 | 100111 1001 | 011000 1001 |
| D1.1 | 21 | 001 00001 | 011101 1001 | 100010 1001 |
| D2.1 | 22 | 011 00010 | 101101 1001 | 010010 1001 |
| . | . | . | . | . |
| . | . | . | . | . |
| . | . | . | . | . |
| D0.2 | 40 | 010 00000 | 100111 0101 | 011000 0101 |
| D1.2 | 41 | 010 00001 | 011101 0101 | 100010 0101 |
| D2.2 | 42 | 010 00010 | 101101 0101 | 010010 0101 |
| . | . | . | . | . |
| . | . | . | . | . |
| . | . | . | . | . |
| D0.3 | 60 | 011 00000 | 100111 0011 | 011000 1100 |
| D1.3 | 61 | 011 00001 | 011101 0011 | 100010 1100 |
| D2.3 | 62 | 011 00010 | 101101 0011 | 010010 1100 |
| . | . | . | . | . |
| . | . | . | . | . |
| . | . | . | . | . |
| D0.4 | 80 | 100 00000 | 100111 0010 | 011000 1101 |
| D1.4 | 81 | 100 00001 | 011101 0010 | 100010 1101 |
| D2.4 | 82 | 100 00010 | 101101 0010 | 010010 1101 |
| . | . | . | . | . |
| . | . | . | . | . |
| . | . | . | . | . |
| D0.5 | A0 | 101 00000 | 100111 1010 | 011000 1010 |
| D1.5 | A1 | 101 00001 | 011101 1010 | 100010 1010 |
| D2.5 | A2 | 101 00010 | 101101 1010 | 010010 1010 |
| . | . | . | . | . |
| . | . | . | . | . |
| . | . | . | . | . |
| D0.6 | C0 | 110 00000 | 100111 0110 | 011000 0110 |
| D1.6 | C1 | 110 00001 | 011101 0110 | 100010 0110 |
| D2.6 | C2 | 110 00010 | 101101 0110 | 010010 0110 |
| . | . | . | . | . |
| . | . | . | . | . |
| . | . | . | . | . |
| D0.7 | E0 | 111 00000 | 100111 0001 | 011000 1110 |
| D1.7 | E1 | 111 00001 | 011101 0001 | 100010 1110 |
| D2.7 | E2 | 111 00010 | 101101 0001 | 010010 1110 |
| . | . | . | . | . |
| . | . | . | . | . |
| . | . | . | . | . |
| D31.7 | FF | 111 11111 | 101011 0001 | 010100 1110 |

FIG. 2 is an encoder system 200 that may be utilized for generating standardized 8B/10B encoding as illustrated in the table above. Referring to FIG. 2, the encoder system 200 may include an input byte bit block 202, an input byte bit label block 204, a 3B4B encoder block 206, a 4B5B encoder block 208, an output code-group bit label block 210 and an encoded output code-group block 212. Input byte bit label block 204 illustrates the arrangement or mapping of the input byte bits corresponding to the input byte bit block 202. Accordingly, input bit 0 corresponds to A, input bit 1 corresponds to B, input bit 2 corresponds to C, input bit 3 corresponds to D, input bit 4 corresponds to E, input bit 5 corresponds to F, input bit 6 corresponds to G, and input bit 7 corresponds to H.

Input byte bits A, B, C, D and E are routed to the input of the 5B6B encoder bock 208 and input byte bits F, G and H are routed to the input of the 3B4B encoder block 206. The output encoded bits generated by the encoder block 208 includes output code group bits a, b, c d, e and i. The output encoded bits generated by the encoder block 206 includes output code group bits f, g, h and j. The byte code-groups bits in the output code-group bit label block 210 are mapped to corresponding bits in the encoded output code-group block 212. Accordingly, output bit a corresponds to 0, output bit b corresponds to 1, output bit c corresponds to 2, output bit d corresponds to 3, output bit e corresponds to 4, output bit i corresponds to 5, output bit f corresponds to bit 6, output bit g corresponds to 7, output bit h corresponds to 8, output bit j corresponds to 9. Accordingly, the encoder system 200 encodes an 8-bit input to the input byte bit block 202 into a corresponding 10-bit output at the encoded output code-group block 212.

The encoder system 200 of FIG. 2 utilizes a 5B6B sub-block and a 3B4B sub-block to generate the 8B10B code. In this regard, a 5B6B code table and a 3B4B code may be utilized to generate an 8B10B code table similar the table above. Each of the 5B6B and 3B4B tables may have an current RD(−) column and a current RD(+) column. The current RD may refer to a state of the RD at the end of a last sub-block. Various rules may be implemented to generate the encoded 8B10B code-groups i. As referenced in the table and FIG. 2, the first six bits a, b, c, d, e and i may form a first sub-block and the second four bits f, g, h and j may form a second sub-block corresponding to 5B6B encoder block 208 and 3B4B encoder block 206 respectively. An RD at the beginning of the 6-bit for first sub-block is the RD at the end of the last code-group. The RD at the beginning of the 4-bit or second sub-block corresponds to the RD at the end of the 6-bit sub-block. The RD at the end of the code-group corresponds to the RD at the end of the 4-bit sub-block.

The RD at the end of any sub-block is positive in instances where the sub-block contains more ones than zeros. The RD is also positive at the end of the 6-bit or first sub-block if the 6-bit sub-block is 000111. The RD is also positive at the end of the 4-bit or second sub-block whenever the 4-bit sub-block is 0011. The RD at the end of any sub-block may be negative in instances where the sub-block contains more zeros than ones. The RD may also be negative at the end of the 6-bit or first sub-block in cases where the 6-bit or first sub-block is 111000. Similarly, the RD is also negative at the end of the 4-bit or second sub-block whenever the 4-bit sub-block is 1100. In other instances, the RD at the end of the sub-block may be the same as at the beginning of the sub-block. In order to limit run length for both ones and zeros between the sub-blocks, sub-blocks that are encoded as 000111 or 0011 may be generated only when the RD at the beginning of the sub-block is positive. Accordingly, the RD at the end of these sub-blocks will also be positive. Likewise, sub-blocks that are encoded as 111000 or 1100 may be generated only when the RD at the beginning of the sub-block is negative. Accordingly, the RD at the end of these sub-blocks will also be negative.

On the transmitter side, during encoding, a transmitter or encoder will assume an initial negative RD. On the receiver side, a negative or positive RD may be assumed by the receiver. On the receiver side, during decoding, code-groups may be checked to determine their validity. If a current code-group is valid, the new RD will be generated. Since an RD must either be zero (0) or one (1), the RD may be utilized to check errors.

The stream of encoded data words transmitted across the link infrastructure 110, using a current running disparity encoding scheme, constitute a primary communication channel with a certain limited utilized information capacity.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the invention provide a method and system for coding information in a communication channel. More particularly, aspects of the invention provide an method and system for synchronous running encryption and/or encoding and corresponding decryption and decoding in a communication channel or link. Aspects of the method may include encoding and/or encrypting a first data using a first or second encoding table and/or a first or second encryption table. The method may indicate which one of the first or second encoding tables or which one of the first or second encryption tables were utilized for encoding and/or encrypting the first data. The encoded and/or encrypted first data may subsequently be transferred downstream.

A subsequent determination may be made as to which table was utilized for encoding and/or encrypting the first data. The encoded and/or encrypted first data may be synchronously decoded and/or decrypted using a first decoding table and/or first decryption table corresponding to the first or second encoding table and/or the first and second encryption table, respectively. Information may be generated to indicate which table or tables were utilized to encode and/or encrypt the first data. The generated information may be embedded in the encoded and/or encrypted first data. The generated information may be transferred via an in-band communication channel and/or transferred along with the encoded and encrypted first data. The generated and transferred information may be received and utilized for synchronously decoding and/or decrypting the encoded and encrypted first data.

A second data may be encoded and/or encrypted using the first or second encoding table, or a third encoding table and/or the first or second encryption table, or a third encryption table. The method may indicate which one of the first, second, or third encoding tables and/or the first, second or third encryption tables, were utilized for encoding and/or encrypting the second data. The encoded and/or encrypted second data may be transferred downstream.

A subsequent determination may be made as to which table or tables were utilized for encoding and/or encrypting the second data. The encoded and/or encrypted second data may be synchronously decoded and/or decrypted using the first decoding or second decoding tables and/or the first or second decryption tables corresponding to the first, second or third encoding tables and/or the first, second and/or third encryption tables, respectively. Information may be generated to indicate which table or tables were utilized to encode and/or encrypt the second data. The generated information may be embedded in the encoded and/or encrypted second data. The generated information for the second data may be transferred via an in-band channel or within the encoded and/or encrypted second data. The generated and transferred information for the second data may be received and utilized for synchronously decoding and/or decrypting the encoded and encrypted second data. The first and second data may be data bytes or they may be blocks of data.

Another embodiment of the invention may provide a machine-readable storage, having stored thereon, a computer program having at least one code section for coding information in a communication channel. The at least one code section may be executable by a machine, thereby causing the machine to perform the steps for coding information in a communication channel as described above.

A further aspect of the invention provides a system for coding information in a communication channel. The system for coding information in a communication channel may include at least one synchronous encoder and/or at least one synchronous encryptor that encodes and/or encrypts a first data using a first or second encoding table and/or a first or second encryption table. The synchronous encoder and/or synchronous encryptor may indicate which one of the first or second encoding tables or which one of the first or second encryption tables were utilized for encoding and/or encrypting the first data. A modulator may modulate and transfer the encoded and/or encrypted first data downstream.

At least one synchronous decoder and at least one synchronous decryptor may subsequently determine which table was utilized for encoding and/or encrypting the first data. The synchronous decoder and/or the synchronous decryptor may synchronously decode and/or decrypt the encoded and/or encrypted first data using a first decoding table and/or first decryption table corresponding to the first or second encoding tables and/or the first and second encryption tables, respectively. The synchronous encoder and/or synchronous encryptor may generate information to indicate which table or tables were utilized to encode and/or encrypt the first data. The generated information may be embedded in the encoded and/or encrypted first data. The modulator may modulate and transfer the generated information via an in-band communication channel. The modulator may modulate and transfer the generated information along with the encoded and encrypted first data. A demodulator may receive and demodulate the transferred information, which may be utilized for synchronously decoding and/or decrypting the encoded and/or encrypted first data.

The synchronous encoder and/or synchronous encryptor may be encode and/or encrypt a second data using the first or second encoding tables, or a third encoding table and/or the first or second encryption tables, or a third encryption table. The synchronous encoder and/or synchronous encryptor may indicate which one of the first, second, or third encoding tables and/or the first, second or third encryption tables, were utilized for encoding and/or encrypting the second data. The modulator may modulate and transfer the encoded and/or encrypted second data downstream.

The synchronous decoder and/or the synchronous decryptor may subsequently determine which table was utilized for encoding and/or encrypting the second data. The synchronous decoder and/or the synchronous decryptor may synchronously decode and/or decrypt the encoded and/or encrypted second data using the first decoding or second decoding tables and/or the first or second decryption tables corresponding to the first, second or third encoding tables and/or the first, second and/or third encryption tables, respectively. The synchronous encoder and/or synchronous encryptor may generate information to indicate which table or tables were utilized to encode and/or encrypt the second data. The modulator may modulate and transfer the generated information for the second data via an in-band communication channel. The modulator may modulate and transfer the generated information with the encoded and encrypted second data. A demodulator may receive and demodulate the transferred information, which may be utilized for synchronously decoding and/or decrypting the encoded and/or encrypted second data. The synchronous encoder and synchronous encryptor may be integrated into a single synchronous encoder/encryptor functional block or unit. Similarly, the synchronous decoder and synchronous decryptor may be integrated into a single synchronous decoder/decryptor functional block or unit.

These and other advantages, aspects and novel features of the present invention, as well as details of a illustrated embodiment thereof, will be more fully understood from the following description and drawings.

DETAILED DESCRIPTION OF THE INVENTION

Aspects of the invention provide a method and system for coding information in a communication channel. More particularly, aspects of the invention provide an method and system for synchronous running encryption and/or encoding and corresponding decryption and decoding in a communication channel or link. Aspects of the method may include encoding and/or encrypting a first data using a first or second encoding table and/or a first or second encryption table. The method may indicate which one of the first or second encoding tables or which one of the first or second encryption tables were utilized for encoding and/or encrypting the first data. The encoded and/or encrypted first data may subsequently be transferred downstream and decoded by a synchronous decoder/decryptor using a corresponding decoding and/or decryption table. The corresponding decoding and/or decryption table may be determined based on the indicated first and/or second encoding and/or encrypting tables.

Figure 1:
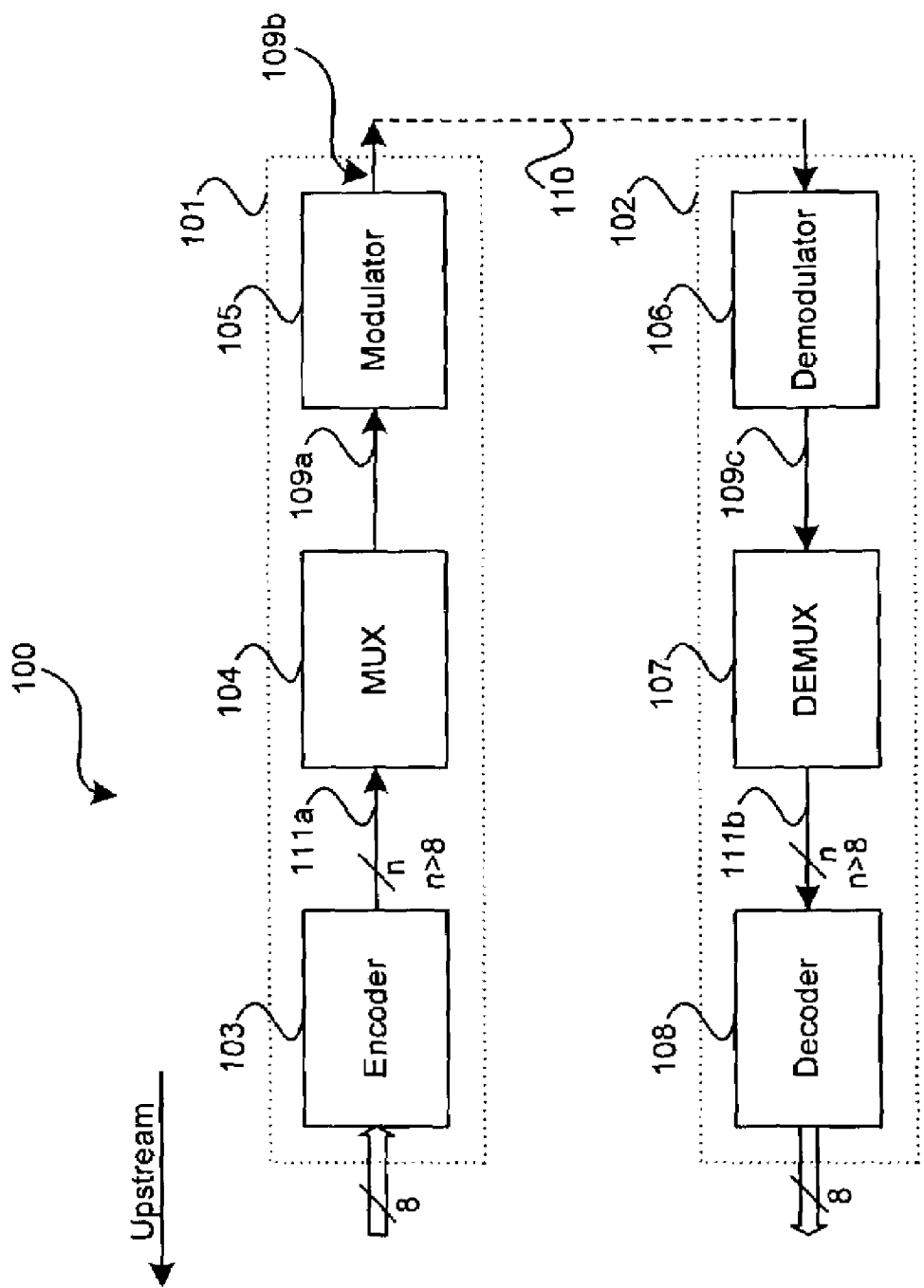
FIG. 1 is a block diagram illustrating a conventional digital communication link having a transmitter side and a receiver side.
Figure 2:
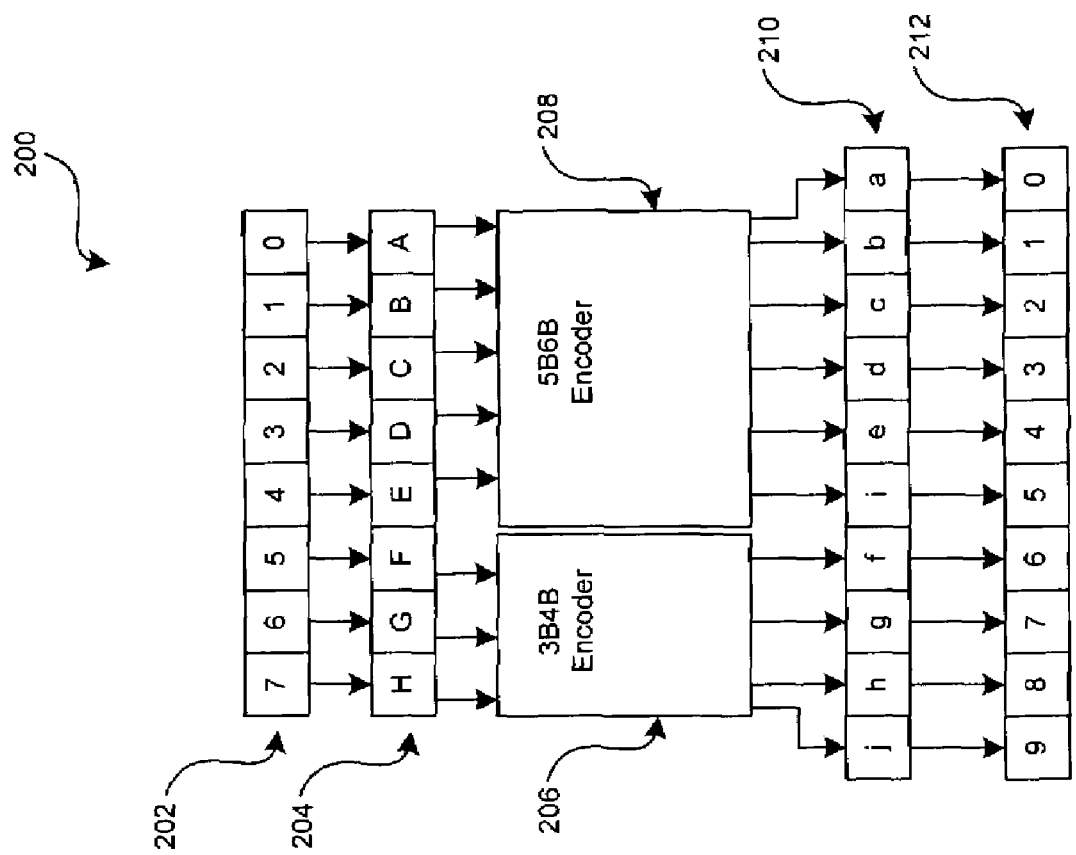
FIG. 2 is an encoder system that may be utilized for generating standardized 8B/10B encoding.
Figure 3A:
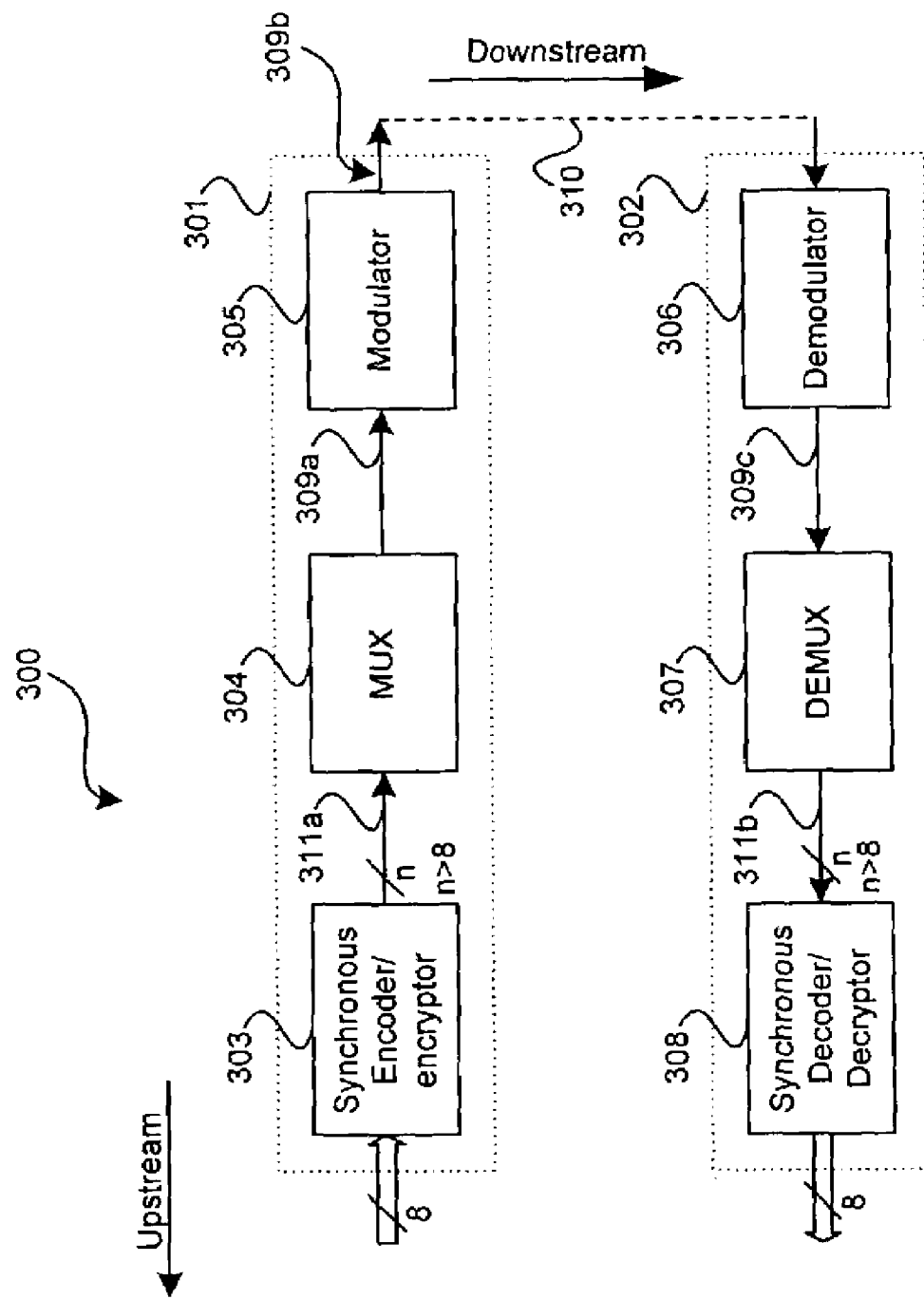
FIG. 3a is a block diagram of an exemplary digital communication link for performing synchronous encoding/encryption and decoding/decryption at the physical level, in accordance with an embodiment of the invention.

FIG. 3a is a block diagram of an exemplary digital communication link 300 for performing synchronous encoding/encryption and decoding/decryption at the physical level, in accordance with an embodiment of the invention. Referring to FIG. 3a, there is shown a digital communication link 300, which may include a transmitter side 301 and a receiver side 302. FIG. 3a illustrates a half-duplex or one-way transmit to receive link. The transmitter side 301 may include a synchronous encoder/encryptor block 303, a multiplexer 304, and a modulator 305. The receiver side 302 may include a demodulator 306, a demultiplexer 307, and a synchronous decoder/decryptor block 308. The transmitter side 301 and the receiver side 302 may be coupled by the link infrastructure 310.

Figure 3B:
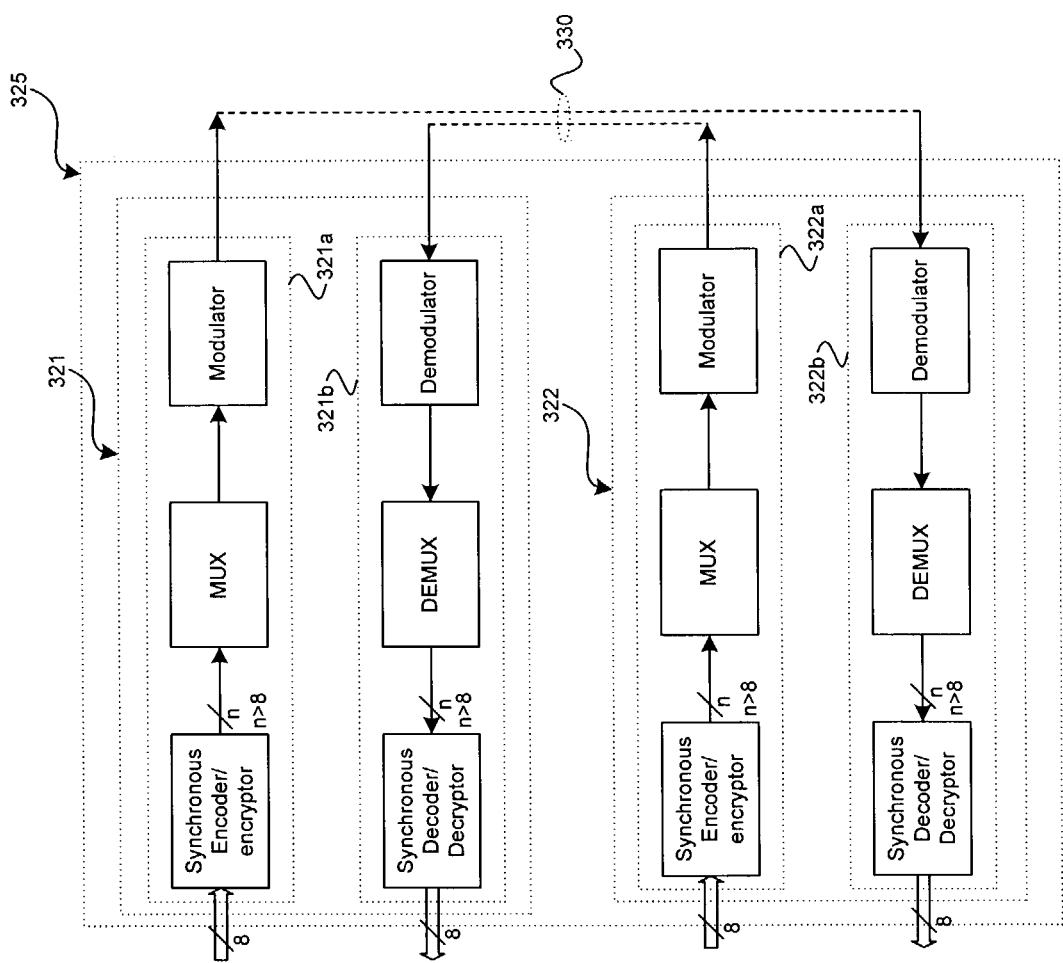
FIG. 3b is a block diagram 32 of the exemplary digital communication link of FIG. 3a illustrating a duplex configuration in accordance with an embodiment of the invention.

In accordance with an embodiment of the invention, both sides of the digital communication link may have both a transmitter side and a receiver side, operating in full duplex mode. In this regard, a transceiver may be adapted to simultaneously transmit and receive data. FIG. 3b is a block diagram 325 of the exemplary digital communication link of FIG. 3a illustrating a duplex configuration in accordance with an embodiment of the invention. Referring to FIG. 3b, there is shown a first transceiver block 321 and a second transceiver block 322. The first transceiver block 321 may include a transmitter block 321a and a receiver block 321b. The second transceiver block 322 may include a transmitter block 322a and a receiver block 322b. The transmitter block 321a of first transceiver block 321 and the transmitter block 322a of the second transceiver block 322 may be configured to operate in a manner similar to the transmitter side 301 of FIG. 3a. Similarly, the receiver block 321b of first transceiver block 321 and the receiver block 322b of the second transceiver block 322 may be configured to operate in a manner similar to the receiver side 302 of FIG. 3a.

Referring to FIG. 3a, the synchronous encoder/encryptor block 303 may be adapted to receive raw unencrypted data bytes and encode and/or encrypt the raw unencrypted data bytes to generate datastream 311a comprising n-bit codewords and/or control words, for example. The resulting coded datastream 311a may be multiplexed into a serial bitstream 309a by the multiplexer 304. The resulting multiplexed serial bitstream 309a may subsequently be transferred to the modulator 305 for processing. The modulator 305 may perform digital-to-analog conversion on the serial bitstream 309a, resulting in an equivalent or corresponding bitstream 309b. The resulting analog serial bitstream 309b may be transferred to the receiver side 302 via the link infrastructure or loopback 310. In certain instances, a data or control word which is transferred to the synchronous encoder/encryptor 303 may have already been encrypted by an upstream component of the digital communication link 300. As a result, the synchronous encoder/encryptor 303 may be adapted to further encrypt the previously encrypted data or control word.

The demodulator 306 on the receiver side 302 may be adapted to receive the analog serial bitstream 309b transferred from the transmitter side 301. The demodulator 306 may perform an analog-to-digital conversion on the received serial bitstream 309b, resulting in a serial digital bitstream 309c. The resulting serial digital bitstream 309c generated by the demodulator 306 may be transferred to the demultiplexer 307 for processing. The demultiplexer 307 may demultiplex the serial digital bitstream 309c by executing the opposite of the multiplexing function performed by multiplexer 304.

The demultiplexer 307 may translate the serial bitstream 309c back into n-bit coded words. For example, in the case of gigabit Ethernet, the demultiplexer 307 may translate the serial bitstream 309c back into 10-bit coded words. The n-bit coded words produced by the demultiplexer 307 may subsequently be transferred to the decoder 308 for processing. The decoder 308 may execute the opposite of the encoder function performed by the encoder 303. In this regard, the decoder 308 may convert the n-bit coded words back into 8-bit unencoded bytes. These 8-bit unencoded bytes, if previously encrypted, may be decrypted by an upstream component of the digital communication link 300, for example.

The encoded/encrypted data word generated by the encoder 303 may be processed through the multiplexer 304 and modulator 305, transmitted over the link infrastructure 310, and processed through the demodulator 306 and demultiplexer 307. The demultiplexed encoded and/or encrypted data word may be transferred to the synchronous decoder/decryptor 308 for processing. In accordance with an embodiment of the invention, the synchronous encoder/encryptor block 303 may be configured to operate in a manner that is synchronous with the operation of the decoder/decryptor 308. In this regard, the synchronous manner of operation may include utilizing the same encryption scheme and/or encoding scheme on a data word that is to be encoded and its corresponding encoded equivalent when it is to be decoded and/or decrypted. Accordingly, the decoder/decryptor 308 is synchronized with the encoder/encryptor 303 and, therefore, uses a corresponding table to decode and decrypt the encoded/encrypted data word.

For illustrative purposes, consider a case where an 8-bit unencoded and unencrypted data word, for example 0x09 or D9.0, is received by the synchronous encoder/encryptor block 303 for encoding and/or encryption. In this case, three scenarios may be possible. In the first scenario, on the transmitter side 301, the synchronous encoder/encryptor block 303 may be configured to encode the unencoded and unencrypted data word D9.0. On the receiver side 302, the synchronous decoder/decryptor block 308 may be configured to decode an encoded representation of the data word D9.0 corresponding to the first scenario. In the second scenario, on the transmitter side 301, the synchronous encoder/encryptor block 303 may be configured to encrypt the unencoded and unencrypted data word D9.0. On the receiver side 302, the synchronous decoder/decryptor block 308 may be configured to decrypt a decrypted representation of the data word D9.0 corresponding to the second scenario. Finally, in the third scenario, on the transmitter side 301, the synchronous encoder/encryptor block 303 may be configured to encode and encrypt the unencoded and unencrypted data word D9.0. On the receiver side 302, the synchronous decoder/decryptor block 308 may be configured to decode and decrypt an encoded and encrypted representation of the data word D9.0 corresponding to the third scenario.

In order to encode and/or encrypt the unencoded or unencrypted data and/or control words, the encoder/encryptor block 303 may be adapted to utilize at least one encryption algorithm or scheme and at least one encoding algorithm or scheme for encryption and encoding on the transmitter side 301. Similarly, at least one corresponding decryption algorithm or scheme and at least one corresponding decoding algorithm or scheme may be utilized in a synchronous manner on the receiver side 302. The encryption, decryption, encoding and/or decoding algorithms or schemes may be implemented in software, hardware or a combination of hardware or software. Notwithstanding, at least one encryption table may be maintained for use by the synchronous encoder/encryptor block 303 and at least one decryption table may be maintained for use by the synchronous decoder/decryptor block 308. In this case, the encryption table maintained for use by the synchronous encoder/encryptor block 303 may correspond with the decryption table maintained for use by the synchronous decoder/decryptor block 308. The encryption, decryption, encoding and/or decoding tables may be stored, for example, in ROM, RAM, or flash memory as lookup tables.

Figure 4B:
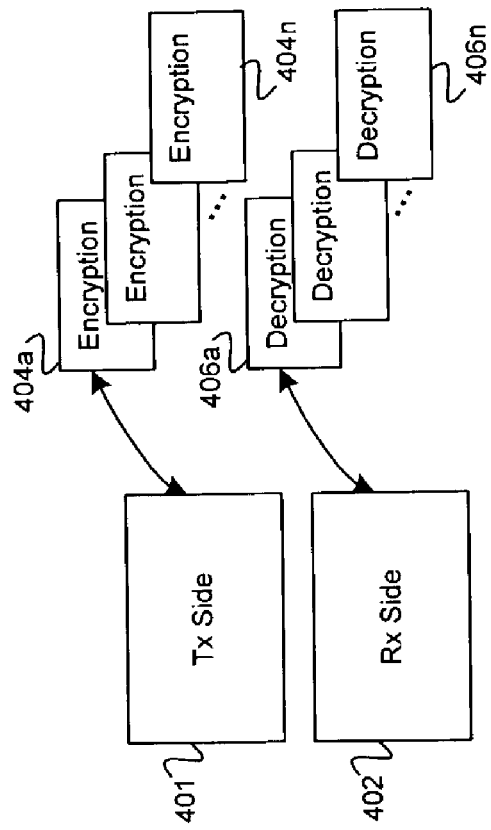
FIG. 4a and FIG. 4b illustrates exemplary encryption and corresponding decryption tables for a transmitter side and a receiver side in accordance with an embodiment of the invention.
Figure 4A:
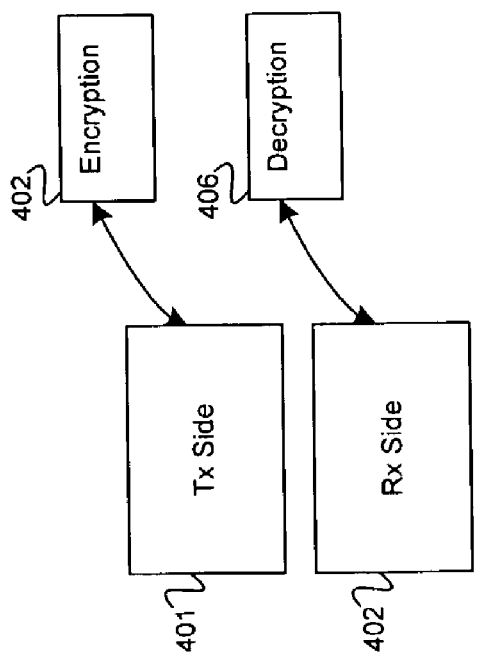

FIG. 4a and FIG. 4b illustrates exemplary encryption and corresponding decryption tables for a transmitter side and a receiver side in accordance with an embodiment of the invention. Referring to FIG. 4a, there is shown a transmitter side 401, a receiver side 402, a encryption table 404 and a corresponding decryption table 406. The encryption table 404 may be maintained for use by the transmitter side 401. Similarly, the corresponding decryption table 406 may be maintained for use by the receiver side 402. Referring to FIG. 4b, there is shown a transmitter side 401, a receiver side 402, a plurality of encryption tables 404a, . . . , 404n and a plurality of corresponding decryption tables 406a, . . . , 406n. The encryption tables 404a, . . . , 404n may be maintained for use by the transmitter side 401. Similarly, the plurality of corresponding decryption tables 406a, . . . , 406n may be maintained for use by the receiver side 402.

At least one encoding table may be maintained for use by the synchronous encoder/encryptor block 303 and at least one decoding table may be maintained for use by the synchronous decoder/decryptor block 308. In this case, the encoding table maintained for use by the synchronous encoder/encryptor block 303 may correspond with the decryption table maintained for use by the synchronous decoder/decryptor block 308.

Figure 4D:
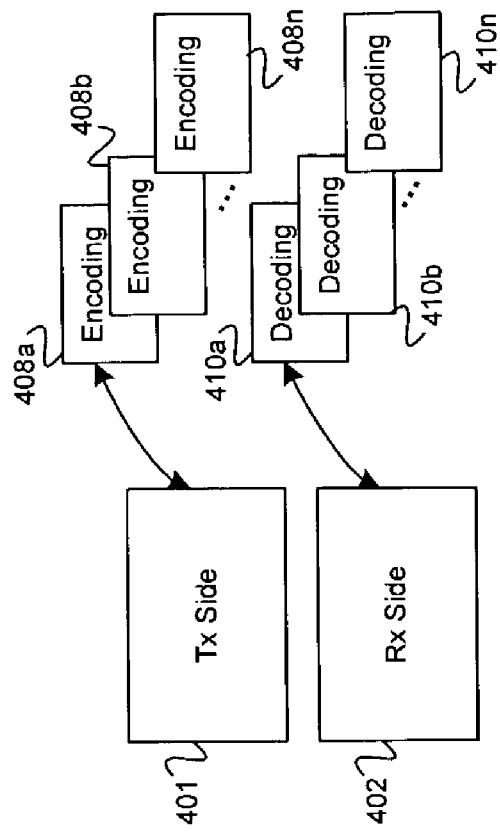
FIG. 4c and FIG. 4d illustrates exemplary encoding and decoding tables for a transmitter side and a receiver side in accordance with an embodiment of the invention.
Figure 4C:
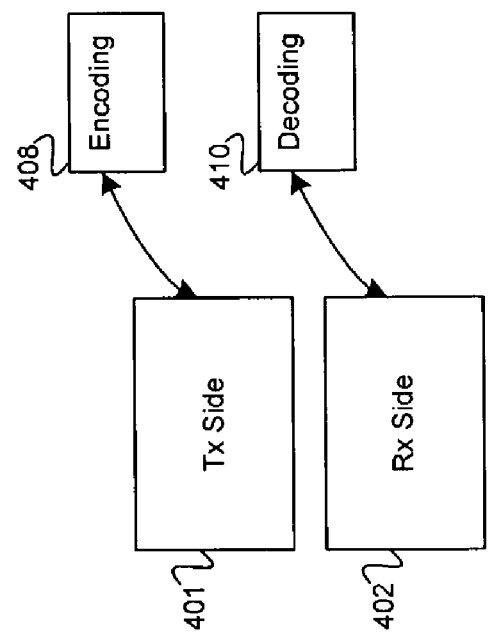

FIG. 4c and FIG. 4d illustrates exemplary encoding and decoding tables for a transmitter side and a receiver side in accordance with an embodiment of the invention. Referring to FIG. 4c, there is shown a transmitter side 401, a receiver side 402, a encoding table 408 and a corresponding decoding table 410. The encoding table 408 may be maintained for use by the transmitter side 401. Similarly, the corresponding decoding table 410 may be maintained for use by the receiver side 402. Referring to FIG. 4d, there is shown a transmitter side 401, a receiver side 402, a plurality of encoding tables 408a, . . . , 408n and a plurality of corresponding decoding tables 410a, . . . 410n. The encoding tables 408a, . . . , 408n may be maintained for use by the transmitter side 401. Similarly, the plurality of corresponding decoding tables 410a, . . . , 410n may be maintained for use by the receiver side 402.

In another aspect of the invention, a combined encryption and decryption table may be maintained for use by the encoder/encryptor block 303 and the decoder/decryptor block 308. Similarly, a combined encoding and decoding table may be maintained for use by the encoder/encryptor block 303 and the decoder/decryptor block 308. Additionally, a single encryption, encoding, decryption and decoding table may be maintained for use by both the encoder/encryptor block 303 and the decoder/decryptor block 308.

Figure 4F:
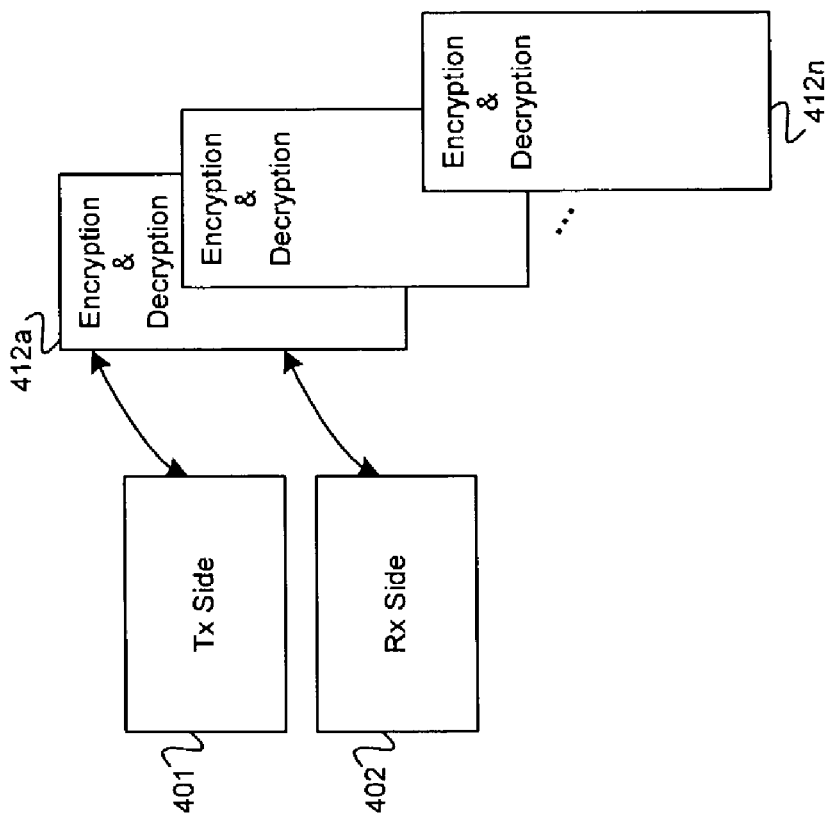
FIG. 4e and FIG. 4f illustrates exemplary combined encryption and decryption tables for a transmitter side and a receiver side in accordance with an embodiment of the invention.
Figure 4E:
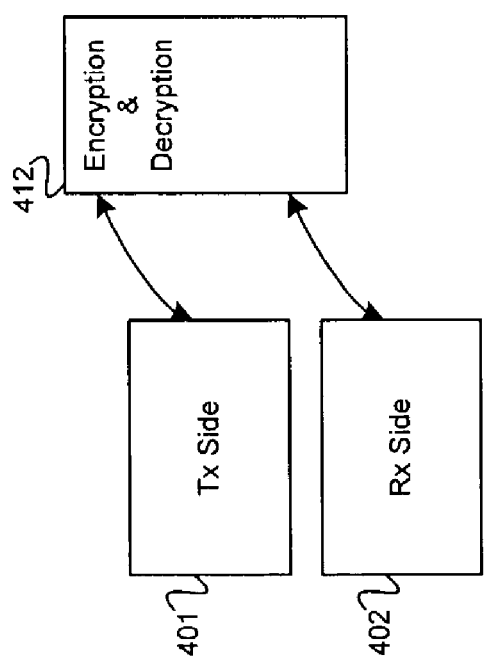

FIG. 4e and FIG. 4f illustrates exemplary combined encryption and decryption tables for a transmitter side and a receiver side in accordance with an embodiment of the invention. Referring to FIG. 4e, there is shown a transmitter side 401, a receiver side 402, a combined encryption and decryption table 412. The combined encryption and decryption table 412 may be utilized by both the transmitter side 401 and the receiver side 402. In this regard, the combined encryption and decryption table may be stored in a location that may be accessible by both the transmitter side 401 and the receiver side 402. Referring to FIG. 4f, there is shown a plurality of combined encryption and decryption tables 412a, . . . , 412n. The plurality of combined encryption and corresponding decryption tables 412a, . . . , 412n may be utilized by both the transmitter side 401 and the receiver side 402. In this regard, the plurality of combined encryption and decryption tables may be stored in a location that may be accessible by both the transmitter side 401 and the receiver side 402.

Notwithstanding, in one aspect of the invention, even though a combined or plurality of combined encryption and corresponding decryption tables may be maintained for use by the transmitter side 401 and the receiver side 402, local copies of the table 412 may be maintained by each of the transmitter side 401 and the receiver side 402. In this regard, a cached copy, for example, of at least a portion of the table 412 may be locally maintained by the transmitter side 401. Similarly, a cached copy, for example, of at least a corresponding portion of the table 412 may be locally maintained by the transmitter side 401.

Figure 4H:
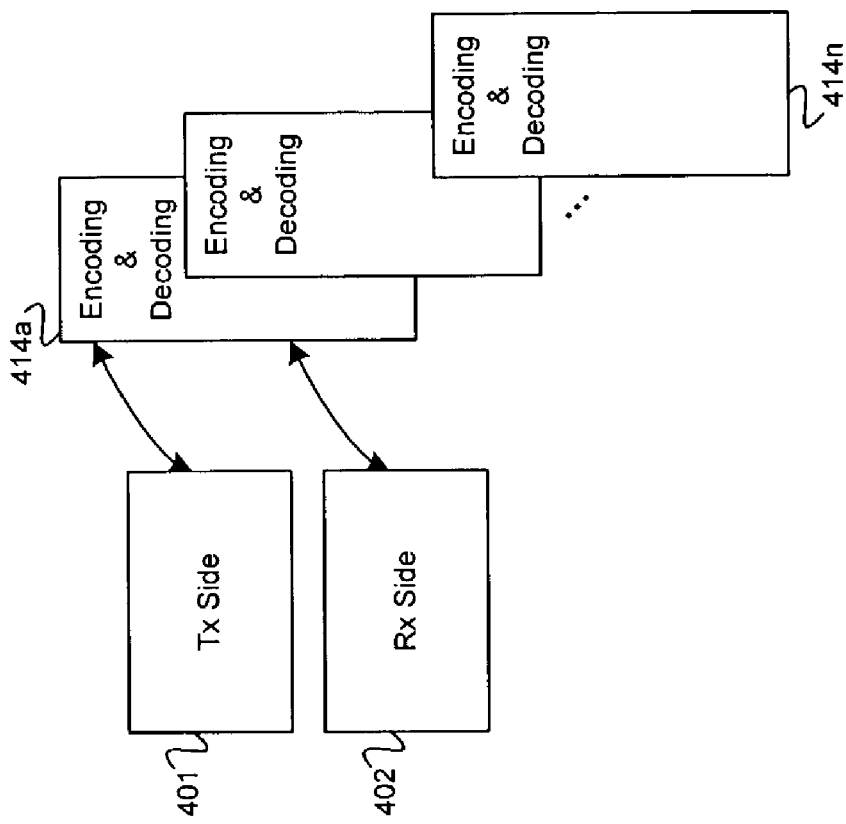
FIG. 4g and FIG. 4h illustrates exemplary combined encoding and decoding tables for a transmitter side and a receiver side in accordance with an embodiment of the invention.
Figure 4G:
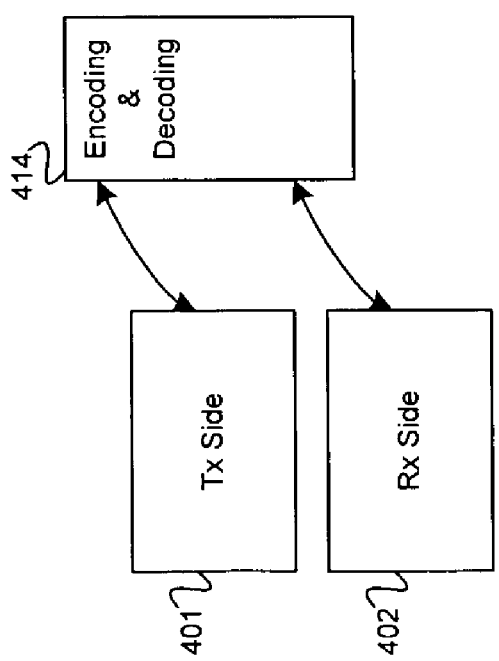

FIG. 4g and FIG. 4h illustrates exemplary combined encoding and decoding tables for a transmitter side and a receiver side in accordance with an embodiment of the invention. Referring to FIG. 4g, there is shown a transmitter side 401, a receiver side 402, a combined encoding and decoding table 414. The combined encoding and decoding table 412 may be utilized by both the transmitter side 401 and the receiver side 402. In this regard, the combined encoding and decoding table may be stored in a location that may be accessible by both the transmitter side 401 and the receiver side 402. Referring to FIG. 4g, there is shown a plurality of combined encoding and decoding tables 414a, ..., 414n. The plurality of combined encoding and corresponding decoding tables 414a, ..., 414n may be utilized by both the transmitter side 401 and the receiver side 402. In this regard, the plurality of combined encoding and decoding tables may be stored in a location that may be accessible by both the transmitter side 401 and the receiver side 402.

Notwithstanding, in one aspect of the invention, even though a combined or plurality of combined encoding and corresponding decoding tables may be maintained for use by the transmitter side 401 and the receiver side 402, local copies of the table 414 may be maintained by each of the transmitter side 401 and the receiver side 402. In this regard, a cached copy, for example, of at least a portion of the table 414 may be locally maintained by the transmitter side 401. Similarly, a cached copy, for example, of at least a corresponding portion of the table 414 may be locally maintained by the transmitter side 401.

FIG. 4g and FIG. 4h illustrates an exemplary combined encryption, decryption, encoding and decoding tables for a transmitter side and a receiver side in accordance with an embodiment of the invention. Referring to FIG. 4g, there is shown a transmitter side 401, a receiver side 402 and a combined encryption, decryption, encoding and decoding table 416. The combined encryption, decryption, encoding and decoding table 416 may be utilized by both the transmitter side 401 and the receiver side 402. In this regard, the combined encryption, decryption, encoding and decoding table 416 may be stored in a location that may be accessible by both the transmitter side 401 and the receiver side 402. Referring to FIG. 4g, there is shown a transmitter side 401, a receiver side 402 and a plurality of combined encryption, decryption, encoding and decoding tables 416a, ..., 416n. The plurality of combined encryption, decryption, encoding and decoding tables 416a, ..., 416n may be utilized by both the transmitter side 401 and the receiver side 402. In this regard, the plurality of combined encryption, decryption, encoding and decoding table 416a, ..., 416n may be stored in a location that may be accessible by both the transmitter side 401 and the receiver side 402.

The exemplary tables of figures FIG. 4a through FIG. 4j may contain at least some of the entries which are in the 8B10B encoding table. Notwithstanding, at least some of the entries in the exemplary tables of FIG. 4a through FIG. 4j may be different since the encoded data may also be encrypted. Accordingly, each of the tables of FIG. 4a through FIG. 4j that are utilized on the transmitter side 301, whether it contains encoded and/or encrypted data, may have a corresponding decoding and/or decryption table, which may be utilized by the receiver side 302. In cases where the encryption and decryption tables are combined, then the combined tables may contain corresponding decryption and encryption entries. For example, a combined encryption and decryption table may contain entries for mapping an unencrypted data word to an encrypted data word, and for mapping an encrypted data word back to its corresponding unencrypted data word. In the cases where the encoding and decoding tables are combined, then the combined tables may contain corresponding decoding and encoding entries. For example, a combined encoding and decoding table may contain entries for mapping an unencoded control word to an encoded control word, and for mapping an encoded control word back to its corresponding unencoded control word.

The synchronous encoder/encryptor block 303 may be configured to generate encoded and/or encrypted data and/or control words from the encoding and/or encryption tables. The encoded and/or encrypted data and/or control words may be processed by the multiplexer 304 and modulated onto the link infrastructure 310 by the modulator block 305. Upon receipt by the receiver 302, demodulator 306 may demodulate the received signal. The resulting signal 309c may then be demultiplexed by the demultiplexer 307, resulting in 10-bit encoded and/or encrypted data and/or control words. The synchronous decoder/decryptor block 308 may be synchronized with the synchronous encoder/encryptor block 303 and, therefore, uses a corresponding table and/or table entry to decode and/or decrypt the encoded/encrypted data word.

In one aspect on the invention, whenever a next data word enters the synchronous encoder/encryptor 303, a new table may be utilized by the synchronous encoder/encryptor 303 to encode and/or encrypt the next data word. Because the decoder/decryptor 308 is synchronized to the encoder/encryptor 303, the new table may also be utilized by the decoder/decryptor 308 on the next data word. In another aspect of the invention, a receiver may be adapted to determine based on the received data, a corresponding decryption and/or encoding table that may be used to decrypt and/or decode the received data. Accordingly, the transmitter 301 may be adapted to embed various information in the encrypted and/or encoded data that may indicate to a receiver, which table should be utilized for decrypting and/or decoding encoded data. Specifically, the synchronous encoder/encryptor block 303 may be adapted to encrypt and/or encode various information in the encrypted and/or encoded data that may indicate to the synchronous decoder/decryptor block 308, which table should be utilized for decrypting and/or decoding encoded data.

For example, in FIG. 4b, encryption table 404a and decryption table 406a may be corresponding tables. Accordingly, the transmitter side 401 may embed information in the encrypted data, which may indicate that encryption table 404a and decryption table 406a are corresponding tables. Accordingly, when the receiver side 402 receives the encoded information, the receiver side 402 will determine based on the received encoded information, that table 406a should be utilized for decrypting the encrypted data. Similarly, in FIG. 4b, for example, encryption table 408b and decryption table 410b may be corresponding tables. Accordingly, the transmitter side 401 may embed information in the encrypted data, which may indicate that encryption table 408b and decryption table 410b are corresponding tables. Accordingly, when the receiver side 402 receives the encoded information, the receiver side 402 will determine based on the received encoded information, that table 410b should be utilized for decrypting the encrypted data. In this manner, a synchronous encoding/decoding and decoding/decrypting system is provided.

Figure 4J:
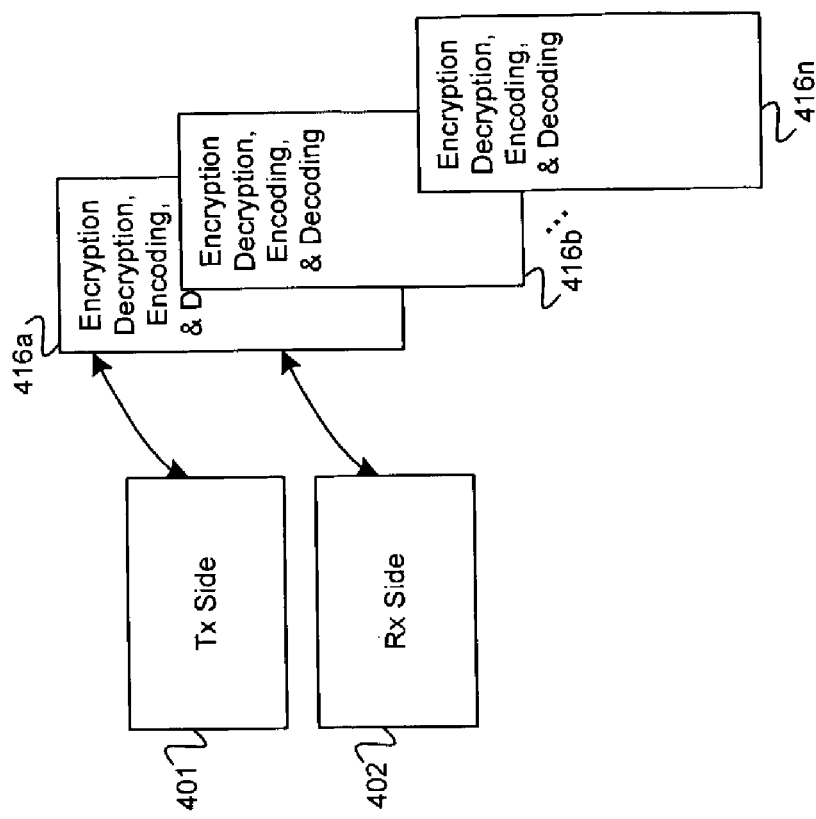
FIG. 4i and FIG. 4j illustrates an exemplary combined encryption, decryption, encoding and decoding tables for a transmitter side and a receiver side in accordance with an embodiment of the invention.
Figure 4I:
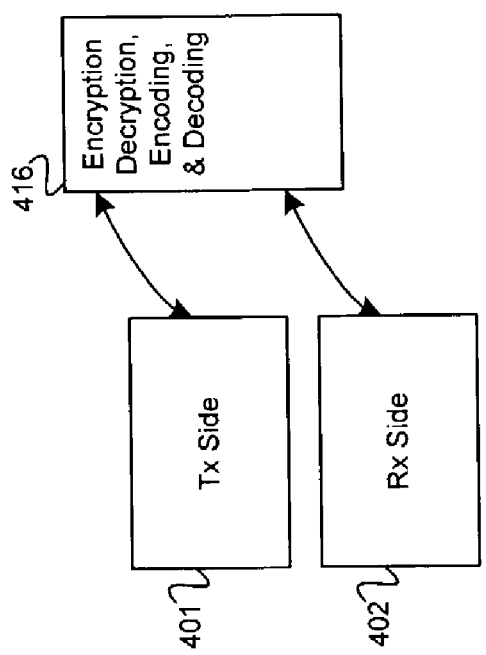

In cases where the corresponding encryption, decryption, encoding and decoding entries may be located in the same table, then the corresponding encoding and/or encryption and decoding and/or decryption data may be extracted from the mappings for a particular table. Referring to FIG. 4j and FIG. 3, for example, if a synchronous encoder/encryptor of the transmitter side utilizes table 416b for encryption and encoding, it may embed control information in the encoded data to signify that table 416b was used for encryption and encoding. The receiver side 402 may decode the received decrypted and encoded signal and determine based on the embedded control information that table 416b should be utilized for decryption and decoding. Accordingly, a synchronous decoder/decryptor for the receive side 402 may utilize corresponding decryption and decoding entries in table 416b for decrypting and decoding received signal.

In one embodiment of the invention, the embedding of control information in the encrypted and/or encoded data may be utilized as an in-band channel. In this regard, the in-band communication may be utilized for controlling the operation of any one or more of the synchronous encoder/encryptor block 303, the synchronous decoder/decryptor block 308, the multiplexer 304, the demultiplexer 307, the modulator 305 and/or the demodulator 306. The in-band channel may be utilized for flow control, for example. Accordingly, a parity error, for example, may be inserted in the bitstream of an encoded or encrypted signal to provide flow control.

Synchronization of tables between the synchronous encoder/encryptor 303 and the synchronous decoder/decryptor 308 may be accomplished by transmitting synchronization data between the synchronous encoder/encryptor 303 and the synchronous decoder/decryptor 308 via overlayed secondary communication channel as described U.S. Provisional Application 60/446,894 filed on Feb. 12, 2003, which is incorporated herein by reference in its entirety. Synchronization of tables between the synchronous encoder/encryptor 303 and the synchronous decoder/decryptor 308 may also be achieved by utilizing spare link bandwidth as described in U.S. Provisional Application 60/448,703 filed on Feb. 18, 2003. However, the invention is not limited in this regard and other synchronization techniques may also be utilized. For example, upon initialization of communication over the link, normal 8B10B encoding/decoding may be used without encryption until a running synchronization is established, at which point, synchronous running encryption and encoding may commence.

Although the synchronous encoder/encryptor block 303 may be adapted to switch to a new table to encode and/or encrypt a next data word, the invention is not so limited. Accordingly, the synchronous encoder/encryptor block 303 and decoder/decryptor block 308 may be synchronized to switch to a new table for blocks of data words instead of switching for every data word. Other synchronous switching schemes may also be utilized. For example, various block sizes for the data words may be established and the block sizes may be predefined or may be dynamically altered. Dynamic alteration may permit the various encoding and/or encryption schemes to be utilized based on channel conditions, for example. Additionally, this may also be utilized to provide more reliable transmission over the digital communication link 300 by further controlling DC balance, maximum run length, maximum RDS, and transition density. Additionally, separate code groups may also be provided for controlling signaling and providing code groups synchronization.

Figure 5:
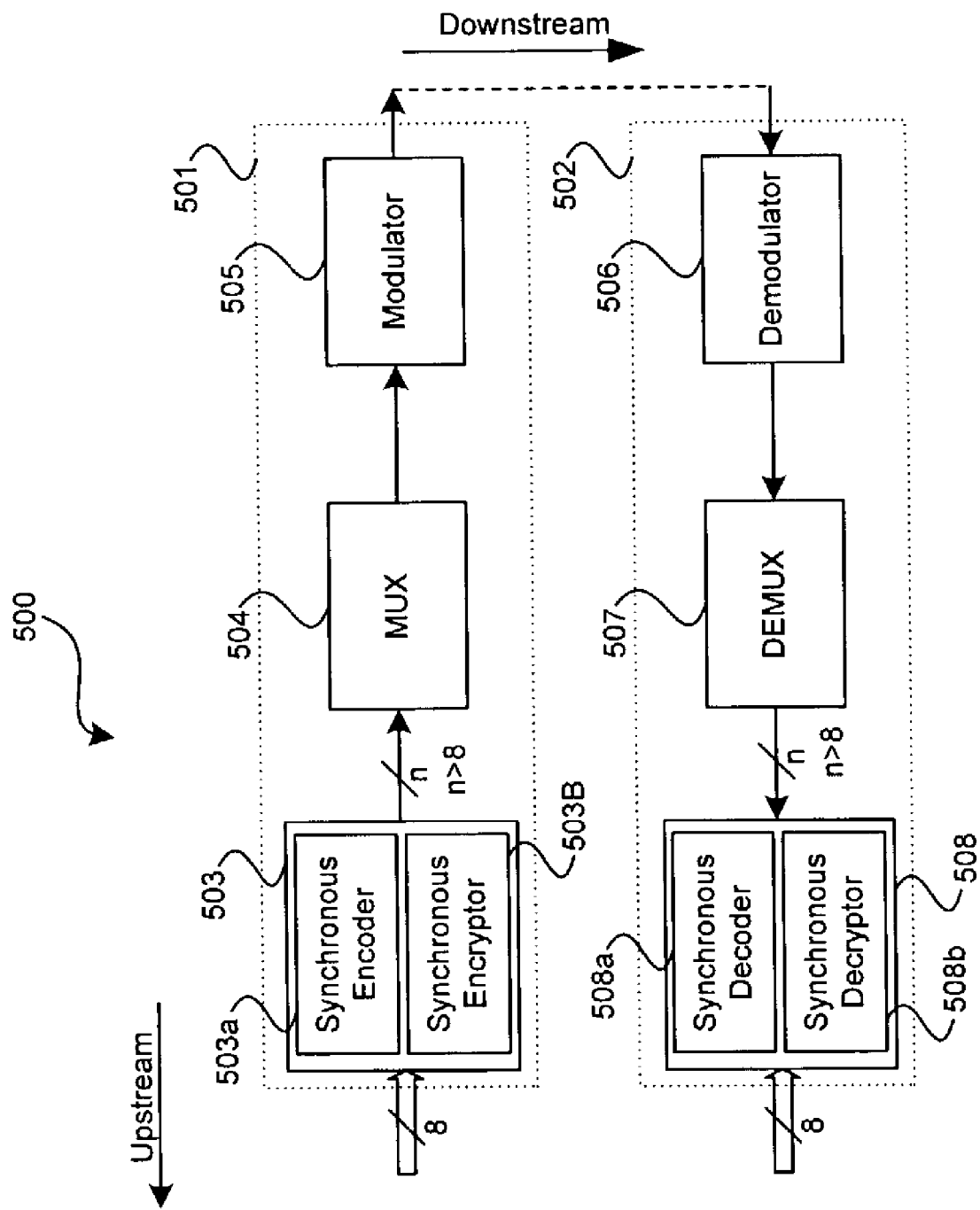
FIG. 5 is a block diagram of a system 500 for coding information in a communication channel in accordance with an embodiment of the invention.

FIG. 5 is a block diagram of a system 500 for coding information in a communication channel in accordance with an embodiment of the invention. Referring to FIG. 5, there is shown a transmit side 501 and a receive side 502. The transmit side 501 may include a synchronous encoder/encryptor block or unit 503, a multiplexer (MUX) 504 and a modulator 505. The synchronous encoder/encryptor block or unit 503 may include an integrated synchronous encoder 503a and synchronous encryptor 503b. The synchronous encryptor block 503b may be any encryption engine such as a DES or 3 DES engine for example. The receive side 502 may include a synchronous a demodulator 506, a demultiplexer (DEMUX) 507 and a decoder/decryptor block or unit 508. The synchronous decoder/decryptor block or unit 508 may include an integrated synchronous decoder 508a and synchronous decryptor 508b. The synchronous decryptor block 508b may be any encryption engine such as a DES or 3 DES engine, for example.

Notwithstanding, the synchronous encoder 503a and/or the synchronous encryptor 503b may encode and/or encrypt a first data using a first or second encoding table and/or a first or second encryption table. The synchronous encoder 503a and/ or synchronous encryptor 503b may indicate which one of the first or second encoding tables or which one of the first or second encryption tables were utilized for encoding and/or encrypting the first data. After multiplexing by the MUX 504, the modulator 505 may modulate and transfer the encoded and/or encrypted first data downstream.

The synchronous decoder 508a and/or the synchronous decryptor 508b may subsequently determine which table was utilized for encoding and/or encrypting the first data. The synchronous decoder 508a and/or the synchronous decryptor 508b may synchronously decode and/or decrypt the encoded and/or encrypted first data using a first decoding table and/or first decryption table corresponding to the first or second encoding table and/or the first and second encryption table, respectively. The synchronous encoder 503a and/or synchronous encryptor 503b may generate information to indicate which table or tables were utilized to encode and/or encrypt the first data. The generated information may be embedded in the encoded and/or encrypted first data. The modulator 505 may modulate and transfer the generated information via an in-band communication channel. The modulator 505 may also modulate and transfer the generated information with the encoded and encrypted first data. The demodulator 506 may receive and demodulate the transferred information, which may be utilized for synchronously decoding and/or decrypting the encoded and/or encrypted first data.

The synchronous encoder 503a and/or synchronous encryptor 503b may encode and/or encrypt a second data using the first or second encoding table, or a third encoding table and/or the first or second encryption table, or a third encryption table. The synchronous encoder 503a and/or synchronous encryptor 503b may indicate which one of the first, second, or third encoding tables and/or the first, second or third encryption tables, were utilized for encoding and/or encrypting the second data. The modulator 505 may modulate and transfer the encoded and/or encrypted second data downstream. After demultiplexing by the demultiplexer 507, the synchronous decoder 508a and/or the synchronous decryptor 508b may subsequently determine which table was utilized for encoding and/or encrypting the second data. The synchronous decoder 508a and/or the synchronous decryptor 508b may synchronously decode and/or decrypt the encoded and/ or encrypted second data using the first decoding or second decoding tables and/or the first or second decryption tables corresponding to the first, second or third encoding tables and/or the first, second and/or third encryption tables, respectively.

The synchronous encoder 503a and/or synchronous encryptor 503b may generate information to indicate which table or tables were utilized to encode and/or encrypt the second data. The modulator 505 may modulate and transfer the generated information for the second data via an in-band communication channel. The modulator 505 may modulate and transfer the generated information along with the encoded and encrypted second data. The demodulator 506 may receive and demodulate the transferred information, which may be utilized for synchronously decoding and/or decrypting the encoded and/or encrypted second data.

In summary, a method and system provide running encoding and encryption on a transmit side of a digital communication link that is synchronous with running decoding and decryption on a receive side of the digital communication link. Accordingly, in one embodiment the synchronous decoder/decryptor 508 synchronously switches the tables to correspond with the encoding and/or decoding of the data by the encoding and/or decoding synchronous encoder/encryptor unit 503. The tables are designed and may be utilized by an encoder/encryptor and/or a decoder/decryptor in a synchronous manner to provide encoding/decoding for more reliable transmission and encryption/decryption for more secure communication at the physical level. Even though 8B10B encoding is utilized to illustrate various aspects and/or embodiments of synchronous running encryption and encoding, synchronous running encryption and encoding may also be utilized with other encoding schemes.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for coding information in a communication channel, the method comprising:
    performing by one or more processors and/or circuits, functions comprising:
        one or both of encoding and encrypting a first data using one or more of a first encoding table, a second encoding table, a first encryption table and a second encryption table;
        indicating which one of said one or more of said first encoding table, said second encoding table, said first encryption table and said second encryption table is utilized for said one or both of encoding and encrypting said first data, and which decrypting and/or decoding table corresponds to said one or more of said first encoding table, said second encoding table, said first encryption table and said second encryption table; and
    transferring said one or both of said encoded and encrypted first data downstream for one or both of decoding and decrypting based on said indicating, wherein said one or both of decoding and decrypting is performed synchronously with said one or both of encoding and encrypting of said first data, and wherein said indicating is performed prior to receiving of said one or both of said encoded and encrypted first data.

2. The method according to claim 1, comprising:
    determining one or more of said first encoding table, said second encoding table, said first encryption table and said second encryption table utilized for said one or both of encoding and encrypting said first data; and
    one or both of synchronously decoding and decrypting said one or both of said encoded and encrypted first data utilizing one or both of a first decoding table and a first decryption table corresponding to said determined one or more of said first encoding table, said second encoding table, said first encryption table and said second encryption table.

3. The method according to claim 2, comprising generating information for said indicating of said one or more of said first encoding table, said second encoding table, said first encryption table and said second encryption table utilized for said one or both of encoding and encrypting said first data.

4. The method according to claim 3, comprising embedding said generated information in said one or both of said encoded and encrypted first data.

5. The method according to claim 3, comprising receiving said generated information for said one or both of synchronously decoding and decrypting said one or both of said encoded and encrypted first data.

6. The method according to claim 3, comprising transferring said generated information via one or both of an in-band channel and within said one or both of said encoded and encrypted first data.

7. The method according to claim 1, comprising:
one or both of encoding and encrypting a second data using one or more of said first encoding table, said second encoding table, a third encoding table, said first encryption table, said second encryption table and a third encryption table;
indicating which one of said one or more of said first encoding table, said second encoding table, said third encoding table, said first encryption table, said second encryption table and said third encryption table is utilized for said one or both of encoding and encrypting said second data; and
transferring said one or both of said encoded and encrypted second data downstream.

8. The method according to claim 7, comprising:
determining one or more of said first encoding table, said second encoding table, said third encoding table, said first encryption table, said second encryption table and said third encryption table utilized for said one or both of encoding and encrypting said second data; and
one or both of synchronously decoding and decrypting said one or both of said encoded and encrypted second data utilizing one or more of a first decoding table, a second decoding table, a first decryption table and a second decryption table corresponding to said determined one or more of said first encoding table, said second encoding table, said third encoding table, said first encryption table, said second encryption table and said third encryption table.

9. The method according to claim 8, comprising generating information for said indicating one or more of said first encoding table, said second encoding table, said third encoding table, said first encryption table, said second encryption table, and said third encryption table utilized for said one or both of encoding and encrypting said second data.

10. The method according to claim 9, comprising embedding said generated information in said one or both of said encoded and encrypted second data.

11. The method according to claim 9, comprising receiving said generated information for said one or both of synchronously decoding and decrypting said one or both of said encoded and encrypted second data.

12. The method according to claim 9, comprising transferring said generated information via one or both of an in-band channel and within said one or both of said encoded and encrypted second data.

13. A machine-readable storage having stored thereon, a computer program having at least one code section for coding information in a communication channel, the at least one code section being executable by a machine for causing the machine to perform steps comprising:
one or both of encoding and encrypting a first data using one or more of a first encoding table, a second encoding table, a first encryption table and a second encryption table;
indicating which one of said one or more of said first encoding table, said second encoding table, said first encryption table and said second encryption table is utilized for said one or both of encoding and encrypting said first data, and which decrypting and/or decoding table corresponds to said one or more of said first encoding table, said second encoding table, said first encryption table and said second encryption table; and
transferring said one or both of said encoded and encrypted first data downstream for one or both of decoding and decrypting based on said indicating, wherein said one or both of decoding and decrypting is performed synchronously with said one or both of encoding and encrypting of said first data, and wherein said indicating is performed prior to receiving of said one or both of said encoded and encrypted first data.

14. The machine-readable storage according to claim 13, comprising:
code for determining one or more of said first encoding table, said second encoding table, said first encryption table and said second encryption table utilized for said one or both of encoding and encrypting said first data; and
code for one or both of synchronously decoding and decrypting said one or both of said encoded and encrypted first data utilizing one or both of a first decoding table and a first decryption table corresponding to said determined one or more of said first encoding table, said second encoding table, said first encryption table and said second encryption table.

15. The machine-readable storage according to claim 14, comprising code for generating information for said indicating of said one or more of said first encoding table, said second encoding table, said first encryption table and said second encryption table utilized for said one or both of encoding and encrypting said first data.

16. The machine-readable storage according to claim 15, comprising code for embedding said generated information in said one or both of said encoded and encrypted first data.

17. The machine-readable storage according to claim 15, comprising code for receiving said generated information for said one or both of synchronously decoding and decrypting said one or both of said encoded and encrypted first data.

18. The machine-readable storage according to claim 15, comprising code for transferring said generated information via one or both of an in-band channel and within said one or both of said encoded and encrypted first data.

19. The machine-readable storage according to claim 13, comprising:
code for one or both of encoding and encrypting a second data using one or more of said first encoding table, said second encoding table, a third encoding table, said first encryption table, said second encryption table and a third encryption table;
code for indicating which one of said one or more of said first encoding table, said second encoding table, said third encoding table, said first encryption table, said second encryption table and said third encryption table is utilized for said one or both of encoding and encrypting said second data; and
code for transferring said one or both of said encoded and encrypted second data downstream.

20. The machine-readable storage according to claim 19, comprising:
code for determining one or more of said first encoding table, said second encoding table, said third encoding table, said first encryption table, said second encryption table and said third encryption table utilized for said one or both of encoding and encrypting said second data; and
code for one or both of synchronously decoding and decrypting said one or both of said encoded and encrypted second data utilizing one or more of a first decoding table, a second decoding table, a first decryption table and a second decryption table corresponding to said determined one or more of said first encoding table, said second encoding table, said third encoding table, said first encryption table, said second encryption table and said third encryption table.

21. The machine-readable storage according to claim 20, comprising code for generating information for said indicating one or more of said first encoding table, said second encoding table, said third encoding table, said first encryption table, said second encryption table, and said third encryption table utilized for said one or both of encoding and encrypting said second data.

22. The machine-readable storage according to claim 21, comprising code for embedding said generated information is said one or both of said encoded and encrypted second data.

23. The machine-readable storage according to claim 21, comprising code for receiving said generated information for said one or both of synchronously decoding and decrypting said one or both of said encoded and encrypted second data.

24. The machine-readable storage according to claim 21, comprising code for transferring said generated information via one or both of an in-band channel and within said one or both of said encoded and encrypted second data.

25. A system for coding information in a communication channel, the system comprising:
at least one synchronous encoder and/or at least one synchronous encryptor that one or both of encodes and encrypts a first data using one or more of a first encoding table, a second encoding table, a first encryption table and a second encryption table;
said least one synchronous encoder and/or said at least one synchronous encryptor indicates which one of said one or more of said first encoding table, said second encoding table, said first encryption table and said second encryption table is utilized for said one or both of encoding and encrypting said first data, and which decrypting and/or decoding table corresponds to said one or more of said first encoding table, said second encoding table, said first encryption table and said second encryption table; and
at least one modulator that transfers said one or both of said encoded and encrypted first data downstream for one or both of decoding and decrypting based on said indicating, wherein said one or both of decoding and decrypting is performed synchronously with said one or both of encoding and encrypting of said first data, and wherein said indicating is performed prior to receiving of said one or both of said encoded and encrypted first data.

26. The system according to claim 25, comprising:
at least one synchronous decoder and/or at least one synchronous decryptor that determines one or more of said first encoding table, said second encoding table, said first encryption table and said second encryption table utilized for said one or both of encoding and encrypting said first data; and
said at least one synchronous decoder and/or said at least one synchronous decryptor that one or both of synchronously decodes and decrypts said one or both of said encoded and encrypted first data utilizing one or both of a first decoding table and a first decryption table corresponding to said determined one or more of said first encoding table, said second encoding table, said first encryption table and said second encryption table.

27. The system according to claim 26, wherein said at least one synchronous encoder and/or said at least one synchronous encryptor generates information for said indicating of said one or more of said first encoding table, said second encoding table, said first encryption table and said second encryption table utilized for said one or both of encoding and encrypting said first data.

28. The system according to claim 27, wherein said at least one synchronous encoder and/or said at least one synchronous encryptor embeds said generated information in said one or both of said encoded and encrypted first data.

29. The system according to claim 27, wherein said at least one synchronous decoder and/or said at least one synchronous decryptor receives said generated information for said one or both of synchronously decoding and decrypting said one or both of said encoded and encrypted first data.

30. The system according to claim 27, wherein said at least one synchronous encoder and/or said at least one synchronous encryptor transfers said generated information via one or both of an in-band channel and within said one or both of said encoded and encrypted first data.

31. The system according to claim 25, wherein said at least one synchronous encoder and/or said at least one synchronous encryptor one or both of encodes and encrypts a second data using one or more of said first encoding table, said second encoding table, a third encoding table, said first encryption table, said second encryption table and a third encryption table;
said at least one synchronous encoder and/or said at least one synchronous encryptor indicates which one of said one or more of said first encoding table, said second encoding table, said third encoding table, said first encryption table, said second encryption table and said third encryption table is utilized for said one or both of encoding and encrypting said second data; and
said modulator for transferring said one or both of said encoded and encrypted second data downstream.

32. The system according to claim 31, comprising:
said at least one synchronous decoder and/or said at least one synchronous decryptor that determines one or more of said first encoding table, said second encoding table, said third encoding table, said first encryption table, said second encryption table and said third encryption table utilized for said one or both of encoding and encrypting said second data; and
said at least one synchronous decoder and/or said at least one synchronous decryptor that one or both of synchronously decodes and decrypts said one or both of said encoded and encrypted second data utilizing one or more of a first decoding table, a second decoding table, a first decryption table and a second decryption table corresponding to said determined one or more of said first encoding table, said second encoding table, said third encoding table, said first encryption table, said second encryption table and said third encryption table.

33. The system according to claim 32, wherein said at least one synchronous encoder and/or said at least one synchronous encryptor generates information for said indicating one or more of said first encoding table, said second encoding table, said third encoding table, said first encryption table, said second encryption table, and said third encryption table utilized for said one or both of encoding and encrypting said second data.

34. The system according to claim 33, wherein said at least one synchronous encoder and/or said at least one synchronous encryptor embeds said generated information in said one or both of said encoded and encrypted second data.

35. The system according to claim 33, wherein said at least one synchronous decoder and/or said at least one synchronous decryptor receives said generated information for said one or both of synchronously decoding and decrypting said one or both of said encoded and encrypted second data.

36. The system according to claim 33, wherein said least one synchronous encoder and/or said at least one synchronous encryptor transfers said generated information via one or both of an in-band channel and within said one or both of said encoded and encrypted second data.

* * * * *